US006739163B2

(12) United States Patent
Reinert

(10) Patent No.: US 6,739,163 B2
(45) Date of Patent: May 25, 2004

(54) MOTOR VEHICLE LOCKING DEVICE WITH A SHAFT AS THE COUPLING MEANS

(75) Inventor: Joerg Reinert, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/115,427

(22) Filed: Apr. 4, 2002

(65) Prior Publication Data

US 2002/0162370 A1 Nov. 7, 2002

(30) Foreign Application Priority Data

Apr. 4, 2001 (DE) ........................................ 101 16 739

(51) Int. Cl.[7] .......................... B60R 25/00; E05B 65/12

(52) U.S. Cl. ............................ 70/256; 70/240; 70/472; 292/DIG. 14

(58) Field of Search .......................... 70/256, 240, 241, 70/472, 477, 243, 153; 292/DIG. 14, DIG. 53, DIG. 54, DIG. 62; 180/289

(56) References Cited

U.S. PATENT DOCUMENTS 1,940,979 A * 12/1933 Staples ........................ 70/247
3,820,361 A * 6/1974 Leitner ........................ 70/241
4,589,514 A * 5/1986 Wilson et al. .............. 180/289
4,837,453 A * 6/1989 Wiley et al. ............... 307/10.2
5,730,507 A * 3/1998 MacWilliam et al. ......... 303/89
5,894,749 A * 4/1999 Tomaszewski et al. ....... 70/240
5,996,382 A * 12/1999 Lehmkuhl .................... 70/256
2002/0139157 A1 * 10/2002 Buteta et al. ................. 70/256

FOREIGN PATENT DOCUMENTS

EP 0 722 028 B1 7/1996
FR 1 175 848 5/1957
WO WO 00/70176 11/2000

* cited by examiner

*Primary Examiner*—John B. Walsh
(74) *Attorney, Agent, or Firm*—Nixon Peabody LLP; David S. Safran

(57) ABSTRACT

A motor vehicle locking device with a motor vehicle lock (1) with a connection coupling (2), a lock actuation unit (3) located at a distance from the lock, with a connection coupling (5), and a shaft (7) as the coupling between the connection couplings (2, 5). The shaft (7) has an outer jacket (8) which passes essentially completely between the connection couplings (2, 5), and which normally cannot be turned in the connection coupling (2), and the outer jacket (8) is coupled to a blocking element (9) so that, when the outside jacket (8) is forcibly turned around its lengthwise axis, the blocking element (9) blocks the force transmission element (10) of the connection coupling (2), which element is connected to the shaft (7) or mounted on it, before actuation of the lock mechanism of the motor vehicle lock (1) by the shaft (7) can take place. Alternatively it can also be provided that the force transmission element (10) of the connection coupling (2) is decoupled from the shaft (7) and/or the lock mechanism of the motor vehicle lock (1) by means of the blocking element (9).

11 Claims, 5 Drawing Sheets

MOTOR VEHICLE LOCKING DEVICE WITH A SHAFT AS THE COUPLING MEANS

BACKGROUND OF THE INVENTION

1. Field of the Invention

The invention relates to a motor vehicle locking device with a lock mechanism with a connection coupling, a lock actuation unit located separately from the motor vehicle lock and having a connection coupling, and with a shaft as a coupling between the connection coupling of the motor vehicle lock and the connection coupling of the lock actuation unit. A motor vehicle locking device for a hood is especially intended here.

2. Description of the Related Art

The known motor vehicle locking device underlying the invention (French Patent 1 175 848 B) has a motor vehicle lock with a lock mechanism and locking elements and with a connection coupling, preferably in the form of a so-called "nut" for connecting a coupling means. The motor vehicle lock is located on the inside of a motor vehicle door or at an angle from the inside sheet and the end sheet of the motor vehicle door. Thus, the motor vehicle lock is located at a considerable distance from the lock actuation unit which is located on the outside door wall, generally there in the door handle arrangement, with generally a locking cylinder. The lock actuation unit likewise has a connection coupling for a coupling means. To allow a non-coaxial arrangement of the connection couplings, the coupling means which ensures the transfer of torque from the lock actuation unit to the motor vehicle lock is a flexible shaft here, which is connected to the two connection couplings.

The use of a universal shaft between the connection couplings of a lock actuation unit and of the motor vehicle lock with the same problem is known (European Patent EP 0 722 028 B1).

By actuating the lock actuation unit, under the action of the coupling means, the motor vehicle lock is moved from its locked into its unlocked position. In the unlocked position of the motor vehicle lock, the motor vehicle door can be opened. It has been shown that the coupling means between the lock actuation unit and the motor vehicle lock is a favorite point of attack for attempted theft. Through a hole drilled or forced into the outside door wall, the coupling means can be directly attacked with a tool and it can be turned by force around its lengthwise axis with acceptance of the breaking-off of the coupling means on the connection coupling of the lock actuation unit. The connection coupling on the motor vehicle lock is then subjected to force such that the motor vehicle lock is moved into the unlocked position. The motor vehicle door can thus be opened.

The aforementioned problem is not otherwise limited to the coupling means which ensures torque transfer, even with a non-coaxial arrangement of the connection couplings, but can also occur for a coupling means made simply as a straight, stiff transmission part.

One special problem exists in hood locks, since in modern motor vehicles, under the hood the complete security electronics is housed which must be protected against manipulations and unwanted accesses.

SUMMARY OF THE INVENTION

A primary object of the present invention is to provide a known type of motor vehicle locking device with a coupling means between the connection couplings which will provide improved anti-theft protection.

The aforementioned object is achieved by the shaft having an outside jacket which passes essentially completely between the connection couplings, wherein the outside jacket of the connection coupling of the motor vehicle lock cannot be turned in the normal state, wherein the outside jacket is coupled to a blocking element, and wherein, when the outside jacket is forcibly turned around its lengthwise axis, the blocking element blocks the force transmission element of the connection coupling, which element is connected to the shaft or mounted on it, before actuation of the lock mechanism of the motor vehicle lock by the shaft can take place.

Alternatively, the object can be achieved, in a subordinate approach, by the shaft having an outside jacket which passes essentially completely between the connection couplings, wherein the outside jacket cannot be turned in the connection coupling of the motor vehicle lock in a normal state, wherein the outside jacket is coupled to a blocking element, and wherein, when the outside jacket is forcibly turned around its lengthwise axis, a force transmission element of the connection coupling of the motor vehicle lock, which element is coupled to the shaft or made on it, is de-coupled by means of the blocking element from the shaft and/or the lock mechanism of the motor vehicle lock, before actuation of the lock mechanism of the motor vehicle lock by the shaft can take place.

Basically, it is first provided that, for purposes of improved anti-theft protection, the shaft is surrounded with an outside jacket which passes or is completely closed essentially between the connection couplings. Therefore, an encapsulated shaft is used. However, it has been found in tests that reliable anti-theft protection is still not ensured. If the outside jacket of this encapsulated shaft is attacked sufficiently vigorously and at a sufficient distance from the connection coupling on the motor vehicle lock, nevertheless the outside jacket together with the shaft located therein can be turned around the lengthwise axis in order to turn the shaft itself around the lengthwise axis, and thus, to move the motor vehicle lock, in turn, into the unlocked position. As a result, the invention proposes that the outside jacket, when turned forcibly around its lengthwise axis, be used as a switching element for blocking or, in the subordinate approach, for de-coupling of the force transmission element of the motor vehicle lock.

Therefore, in accordance with the invention, reliable actuation of the motor vehicle lock from the lock actuation unit will cause only rotation of the shaft with the outside jacket stationary, while actuation due to a theft attempt leads to rotation of the outside jacket with the shaft, and thus, makes the motor vehicle lock impossible to unlock.

The invention is explained in detail below using the accompanying drawings which show one embodiment in accordance with the invention.

DETAILED DESCRIPTION OF THE INVENTION

Figure 1:
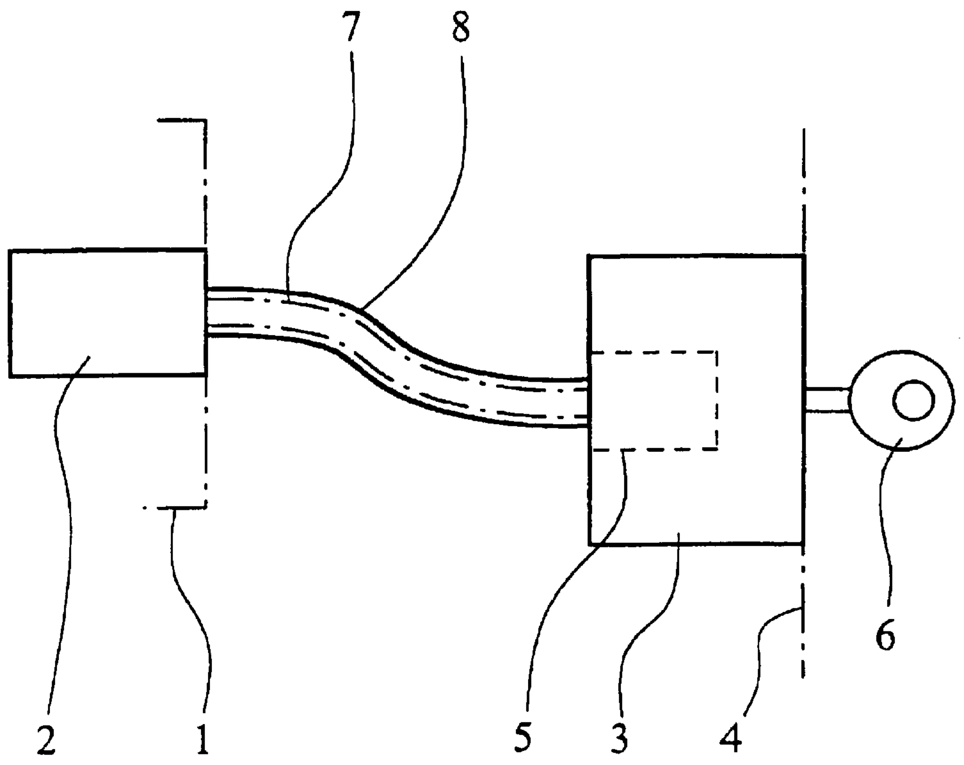
Fig. 1 (Prior Art)
FIG. 1 shows a general plan of a motor vehicle locking device of a known type.

FIG. 1 shows the basic principle of a motor vehicle locking device of the type under consideration, as is already known in the prior art. A motor vehicle lock 1 with a connection coupling 2 is indicated by a broken line. For the motor vehicle lock 1, conventional designs as in the prior art are possible. The connection coupling 2 is often a "nut" in an especially preferred manner.

In this motor vehicle locking device, there is a lock actuation unit 3 arranged separately from the motor vehicle lock 1. This is shown in FIG. 1 attached to the outside door wall 4 which is shown by a broken line. The lock actuation unit 3 generally has a key-actuated lock cylinder, rotary motion of which is transferred to a connection coupling 5 which is likewise only indicated generally indicated here by broken lines. A door key 6, which is used for actuation of the lock cylinder is also represented.

The coupling means between the connection couplings 2, 5 of the motor vehicle lock 1 and the lock actuation unit 3 is a shaft 7 which, in this embodiment, has an outer jacket 8 which passes essentially completely between the connection couplings 2, 5, and therefore is essentially closed. The outer jacket 8 cannot be turned in the connection coupling 2 of the motor vehicle lock 1 in the normal state. Therefore, rotation of the shaft 7 does not lead to rotation of the outer jacket 8, especially, because it is generally attached to the lock actuation unit 3 so as to not be able to rotate in the connection coupling 5.

In accordance with present invention, is provided that the outer jacket 8 is coupled to a blocking element 9, and the blocking element 9 can also be part of the outer jacket 8. When the outside jacket 8 is forcibly turned around its lengthwise axis, as can occur when a tool is directly applied to the outside jacket 8, the blocking element 9 blocks the force transmission element 10 of the connection coupling 2 before the motor vehicle lock 1 can be actuated by the shaft 7.

Figure 2:
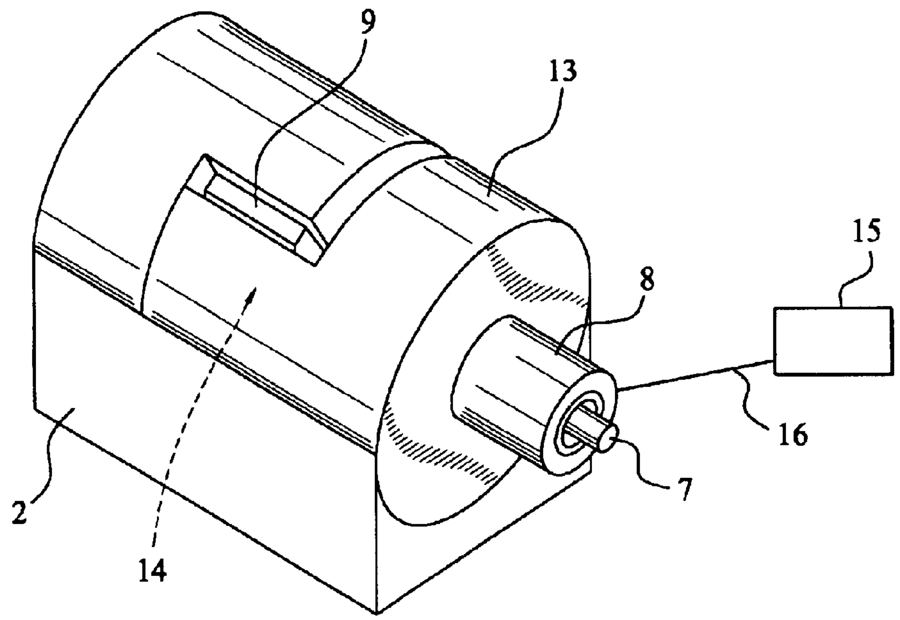
FIG. 2 shows the area of the connection coupling of the motor vehicle lock with the connected flexible shaft together with the outer jacket.
Figure 3:
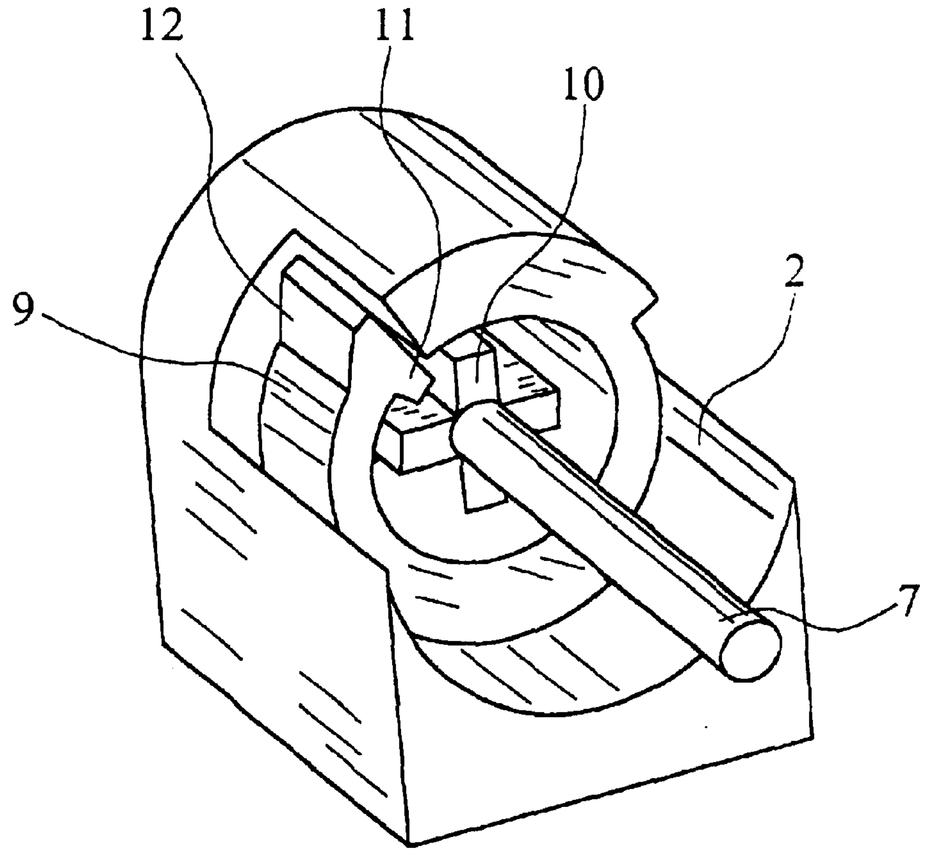
FIG. 3 shows the connection coupling of FIG. 2 with the outer jacket and a driver thereon removed.
Figure 4:
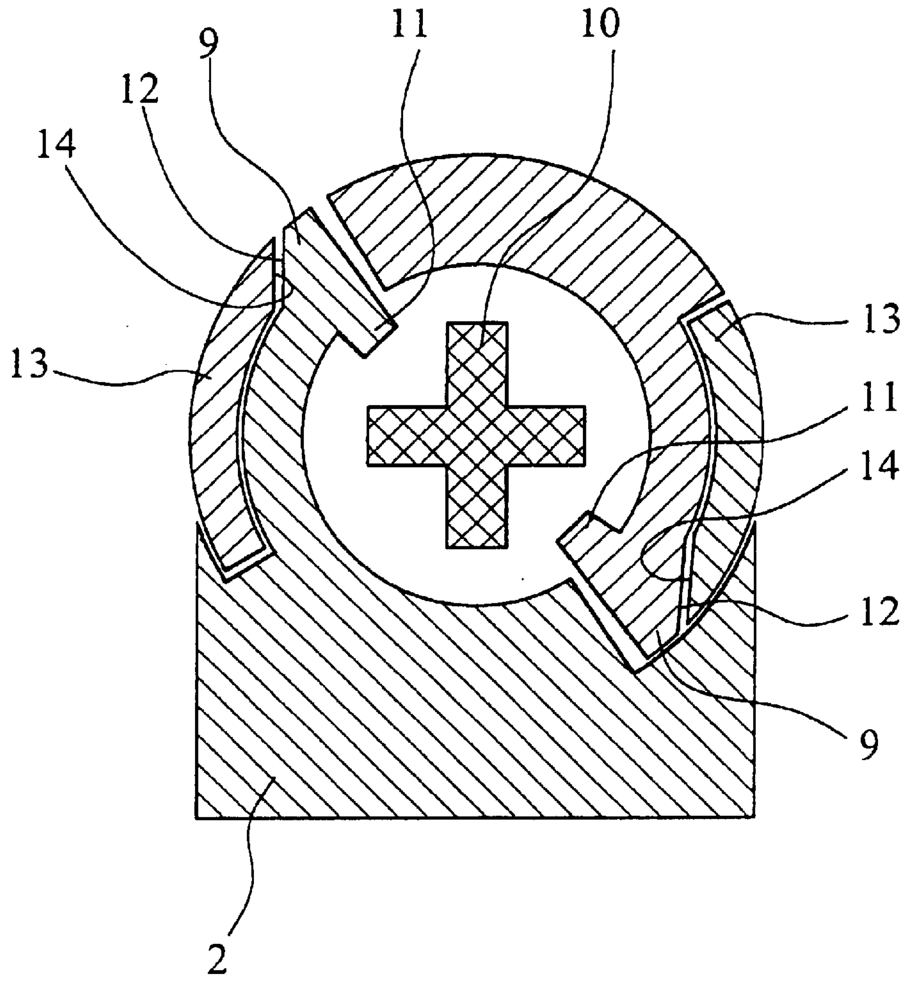
FIG. 4 is a sectional view of the arrangement shown in FIG. 2.

FIG. 4 is as a section through the arrangement of FIG. 2, and in conjunction with the perspective view of FIG. 3, shows that, in the illustrated embodiment, the force transmission element 10 is a cross-shaped paddle which is typical of a nut as a connection coupling 2 and which is already known in the prior art.

With respect to the embodiment of the force transmission element 10, on the one hand, and the blocking element 9 which is actuated by the outer jacket 8, on the other, of course there are many possibilities which need not be explained in detail here. The operation of these two interacting elements which causes blocking when the outer jacket 8 is actuated such that the motor vehicle lock 1 overall blocks against unlocking is important.

The embodiment shown here illustrates that, when the outer jacket 8 is turned by a small angle in a circumferential direction, the blocking element 9 is positioned against the force transmission element 10, resulting in blocking, specifically fitting into the force transmission element 10, blocking by force-fit. FIG. 4 shows the normal, i.e., neutral or released position; however, in the blocking position, the two blocking elements 9 provided here are radially pressed inward.

The illustrated embodiment shows that the force transmission element 10 is located rotationally-symmetrically in the connection coupling 2 and that two blocking elements 9 act on the force transmission element 10 at radially opposite sides. Otherwise, it is shown here that the blocking element 9 has a radially positioned blocking projection 11 which can be engaged to the force transmission element 10 in an interlocking manner. For the embodiment shown, this also applies of course to the two existing blocking elements 9.

The preferred embodiment shown illustrates a mechanical structure which is adapted to a special degree to the coaxial arrangement of the outer jacket 8 with respect to the shaft 7, and thus, the force transmission element 10. It is specifically intended that the blocking element 9 on the outside has a control cam 12 on which a driver 13, which is formed on the outside jacket 8 or is connected to it, runs with a counter-cam 14 such that peripheral rotation of the outside jacket 8 by a small angle causes adequate radial positioning of the blocking element 9 due to the action of the sloping surfaces of the control cam 12 and the counter-cam 14. In this embodiment, this is implemented for the two blocking elements 9 with a driver 13 and two counter-cams 14 which are diametrically opposite one another and which are implemented on it.

A symmetrical configuration of the connection coupling 2 on the motor vehicle lock 1, the configuration being provided with diametrically opposed blocking elements 9, is kinematically favorable because the forces which occur are directed opposite one another and act radially on one another. This embodiment with blocking projections 11 on the blocking elements 9 feasibly corresponds to the execution of the force transmission element 10 as a cross paddle. Thus, an interlocked blocking action results without major structural changes of the motor vehicle lock 1.

Axial positioning can also be considered as an alternative to radial positioning. Then a corresponding control cam or a cam with an axial opposing surface would interact with the corresponding blocking elements.

In any case, spring loading against the blocking direction is recommended, as follows from the drawings. There the blocking elements 9 are made as elastically projecting clips which return by themselves, due to their inherent resiliency, to their radially external neutral position when the application of force by the driver 13 of the outside jacket 8 is eliminated. This is an especially feasible construction when the corresponding part of the connection coupling 2 is made of a molded plastic part. The driver 13 can also be made accordingly as a molded plastic part.

FIG. 3 shows the interaction of the blocking projection 11 on the blocking element 9 (the opposing blocking element 9 is concealed by the shaft 7) with the force transmission element 10 in the form of a cross paddle.

Figure 5:
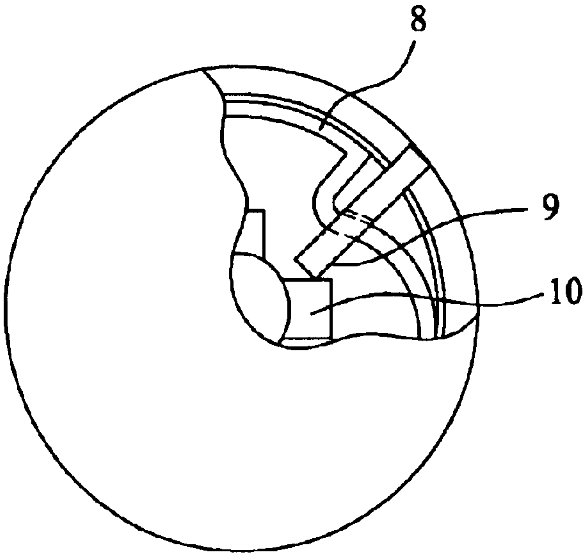
FIG. 5 shows the another embodiment in which the outer jacket is coupled to a blocking element in a normal state.
Figure 6:
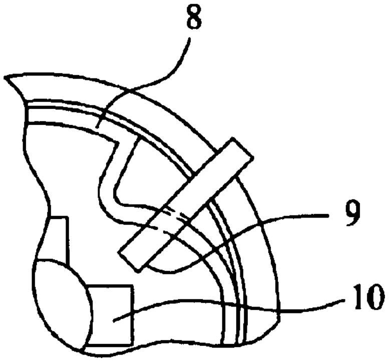
FIG. 6 shows the embodiment of FIG. 5 when the outer jacket turned forcibly around its lengthwise axis.

FIGS. 5 and 6 illustrate reversing exactly the function of the outside jacket 8 in the connection coupling 2 such that the shaft 7 has an outside jacket which passes essentially completely between the connection couplings 2, 5, that the outside jacket 8 in the connection coupling 2 of the motor vehicle lock 1 cannot be turned in the normal state, that the outside jacket 8 is coupled to a blocking element 9 and that, when the outside jacket 8 is turned forcibly around its lengthwise axis, the force transmission element 10 of the connection coupling 2, which element is coupled in the normal state to the shaft 7 or is made on it, is decoupled by means of the blocking element 9 from the shaft 7 and/or from the lock mechanism of the motor vehicle lock 1 before actuation of the lock mechanism of the motor vehicle lock 1 by the shaft can take place. Then no-load operation is accomplished; this has the additional advantage that the lock mechanism of the motor vehicle lock 1, but at least the force transmission element 10 in conjunction with the blocking element 9, cannot be damaged.

Here, there are various possible embodiments. In particular, it is recommended that, when the outside jacket 8 is turned in a circumferential direction by a small angle, the blocking element 9 causes radial or axial decoupling of the force transmission element 10 from the lock mechanism of the motor vehicle lock or from the shaft 7.

In structural terms, this axial or radial decoupling can be accomplished in different ways. Generally, a lever which has been positioned by a spring-loading force or under its own spring force will be pushed out of its position to achieve the desired decoupling.

An embodiment with the flexible shaft 7 as the coupling means is especially preferred; this embodiment is shown. In this embodiment, the transfer of torque between the connection couplings 2, 5 is ensured even for a non-coaxial arrangement. Providing a universal shaft as the coupling means, either on one side or both sides, with a universal joint, is known from the prior art, as initially explained. Finally, it was initially pointed out that, in principle, the teaching of the present invention also has importance when a straight, through shaft is utilized as the coupling means.

The outer jacket 8 can be further used to trigger an alarm 15 by means of a sensor circuit 16 in case of a forcible attack.

I claim:

1. Motor vehicle locking device, comprising:

a motor vehicle lock with a lock mechanism and with a connection coupling, a lock actuation unit with a connection coupling and located at a distance from the motor vehicle lock, and a rotatable shaft which couples the connection coupling of the motor vehicle lock with the connection coupling of the lock actuation unit, wherein the shaft has an outer jacket which passes essentially completely between the connection couplings and is coupled to the connection coupling of the motor vehicle lock, wherein the outer jacket cannot be turned in a normal state, wherein the outer jacket is coupled to a blocking element, and wherein the blocking element blocks a force transmission element within the connection coupling of the motor vehicle lock, which transmission element is connected to the rotatable shaft, in response to forcible turning of the outer jacket around a lengthwise axis thereof so as to prevent actuation of the lock mechanism of the motor vehicle lock by the rotatable shaft.

2. Motor vehicle locking device as claimed in claim 1, wherein the blocking element is positioned relative to the force transmission element in a manner enabling the blocking element to engage the force transmission element, resulting in blocking thereof, when the outer jacket is turned in a circumferential direction.

3. Motor vehicle locking device as claimed in claim 1, wherein blocking the blocking element is adapted to block the force transmission element by interlocking therewith.

4. Motor vehicle locking device as claimed in claim 1, wherein the force transmission element is located rotationally-symmetrically in the connection coupling of the motor vehicle lock, and wherein two blocking elements act on the force transmission element at radially opposite sides.

5. Motor vehicle locking device as claimed in claim 1, wherein the blocking element has a radially positioned blocking projection which is adapted to engage the force transmission element by interlocking therewith.

6. Motor vehicle locking device as claimed in claim 1, wherein the blocking element has a control cam on an outer side thereof on which a driver on an outer side of the outer jacket runs with a countercam such that peripheral rotation of the outer jacket by a small angle causes radial positioning of the blocking element.

7. Motor vehicle locking device as claimed in claim 1, wherein the shaft is a flexible shaft which ensures torque transfer even in a non-coaxial arrangement of the connection couplings.

8. Motor vehicle locking device as claimed in claim 1, wherein the outer jacket is provided with a sensor for triggering of an alarm signal upon a mechanical attack on the outer jacket.

9. Motor vehicle locking device as claimed in claim 1, wherein the motor vehicle locking device is hood lock.

10. Motor vehicle locking device, comprising:

a motor vehicle lock with a lock mechanism and with a connection coupling, a lock actuation unit located at a distance from the motor vehicle lock and having a connection coupling, and a rotatable shaft which couples the connection coupling of the motor vehicle lock with the connection coupling of the lock actuation unit, wherein the shaft has an outer jacket which passes essentially completely between the connection couplings and is coupled to the connection coupling of the motor vehicle lock, wherein the outer jacket cannot be turned in a normal state, wherein the outer jacket is coupled to a blocking element, and wherein, when the outer jacket is forcibly turned around a lengthwise axis thereof, a force transmission element of the connection coupling of the motor vehicle lock, which transmission element is on the shaft, is de-coupled from at least one of the shaft and the lock mechanism of the motor vehicle lock by means of the blocking element so as to prevent actuation of the lock mechanism of the motor vehicle lock by the shaft.

11. Motor vehicle locking device as claimed in claim 10, wherein the outer jacket is adapted to cause the blocking element to decouple the force transmission element from at least one of the lock mechanism of the motor vehicle lock and by turning of the shall by a small angle in a peripheral direction.

* * * * *